Feb. 14, 1956  J. C. TUTTLE  2,734,290
TREE AND STONE GRUBBER
Filed March 16, 1954
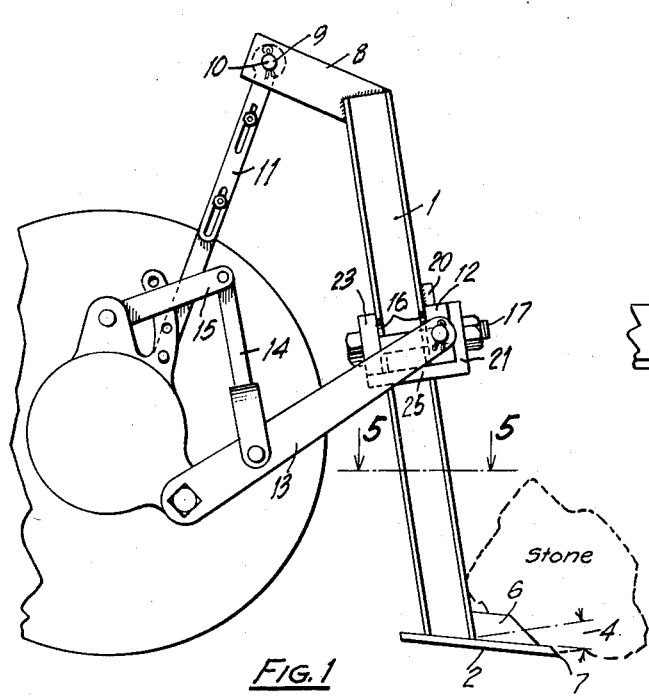
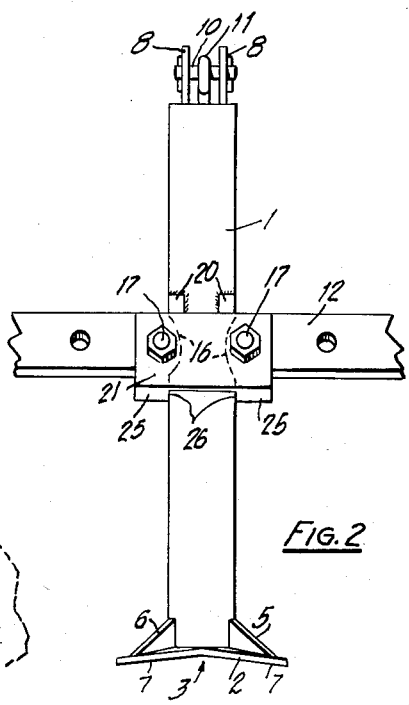
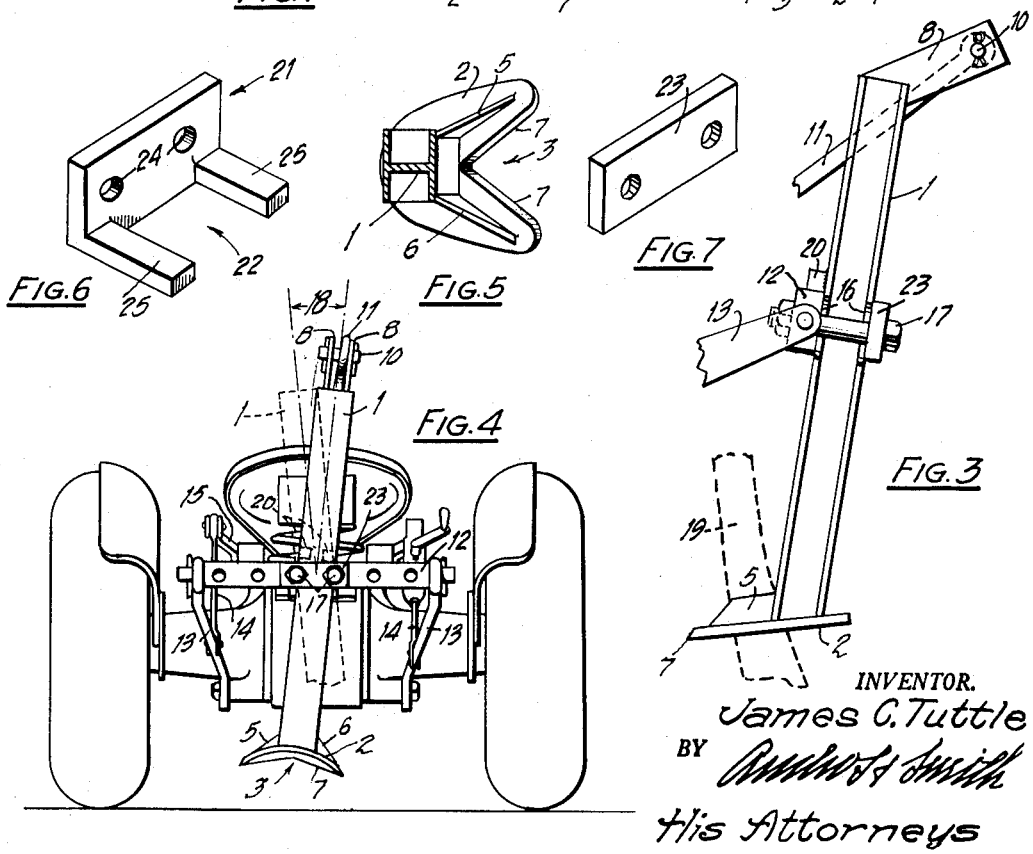
INVENTOR.
James C. Tuttle
BY
His Attorneys United States Patent Office 2,734,290
Patented Feb. 14, 1956

2,734,290

TREE AND STONE GRUBBER

James C. Tuttle, Cambridge, N. Y.

Application March 16, 1954, Serial No. 416,655

2 Claims. (Cl. 37—2)

My invention relates to an attachment for tractors, by means of which small trees may be uprooted and large stones which are partially embedded in the earth may be loosened and raised.

In the clearing of land for the purpose of cultivating it or erecting buildings thereon, it is necessary to remove at least the smaller trees growing thereon and to clear the surface of projecting stones, boulders, and the like.

One of the objects of my invention is to provide a device which may be readily attached to and detached from a tractor and which is adapted to uproot small trees. Another object is to provide such a device which is not only adapted to uproot small trees but which is also adapted to loosen and raise stones and boulders which are partially embedded in the soil.

I accomplish these objects by the means described below and illustrated in the accompanying drawing in which—

Fig. 1 is a side elevation of my device showing a fragmentary portion of a tractor to which the device is attached in a position to loosen partially embedded stones;

Fig. 2 is a right hand side elevation view of my device, as illustrated in Fig. 1, but showing only a portion of the drawbar of the tractor;

Fig. 3 is a side elevation view of my device similar to Fig. 1, illustrating how it is attached to the drawbar of a tractor for use in uprooting small trees;

Fig. 4 is a smaller scale rear view of a tractor showing my device attached thereto in the manner shown in Fig. 3;

Fig. 5 is a section of Fig. 1 in the plane 5—5;

Fig. 6 is a perspective view of one of the elements for attaching my device to the drawbar of a tractor when it is to be used for raising stones; and Fig. 7 is a perspective view of an element used in attaching my device to the drawbar of a tractor when used for uprooting trees.

Referring to the drawings—

My device comprises an elongated beam 1 which is here illustrated as an I-beam. Welded or otherwise secured to the bottom of the beam is a generally triangular plate forming a projecting foot 2 which is bifurcated, as shown at 3 in Fig. 5, and has the edge thereof opposite the bifurcation smoothly rounded so that it will readily slip to the side of and past a tree to be pulled when said edge is moved into contact with the tree, as will be explained below. The branches of the bifurcation are reinforced by the upstanding plates 5 and 6 which may be triangular, as shown in Figs. 2 and 5, or of the shape shown in Figs. 1 and 3, and which are welded to the foot 3 and the beam. The edges of the bifurcation are preferably sharpened, as shown at 7.

Welded to the beam at the top thereof is a pair of spaced plates 8 which project from the beam in a direction opposite that of the foot 2 and which are provided at their free end with holes 9 for the passage of the pin 10, by means of which the plates 8 are connected to the top link 11 of the tractor. By reference to Fig. 3, it will be apparent that, because the plates 8 project upwardly from the top of the beam 1, the top link 11 will prevent the beam from moving upwardly as the tractor advances.

The drawbar of the tractor to which my device is adapted for attachment is shown at 12 and may be raised or lowered by the usual lower links 13, the leveling arms 14 and the lift arms 15. Intermediate its ends and preferably somewhat nearer the top than the bottom, the flanges of the beam are cut out, as shown at 16, so that they are in somewhat laterally spaced relation to the bolts 17, by means of which the beam is secured to the drawbar of the tractor. The purpose of this spacing is to permit the beam to swing laterally through an angle, such as 18, when the device is used for uprooting a tree, shown in dotted outline at 19 in Figure 3. In order to prevent downward movement of the beam, there is welded or otherwise secured to the flange thereof on the side from which the foot projects, a pair of blocks 20 which are supported on the top of the drawbar 12 when the device is attached, as shown in Figs. 1 and 2.

When the device is used for loosening and raising stones, it is desirable to have it secured to the drawbar in substantially fixed relation thereto and, to attain this end, an angle 21 having the central portion of one leg thereof cut out, as shown at 22 in Fig. 6, and a plate 23 (see Fig. 7), are employed along with the bolts 17 for attaching the device to the drawbar. The upright leg of the angle 21 is provided with holes 24 therein for the passage of the bolts 17 and rests against the outer side of the drawbar, as best shown in Fig. 1. The two portions 25 of the other leg of the angle 21 closely embrace the edges of the flanges of the I-beam, as best shown at 26 in Fig. 2. The portions 25 project beyond the beam on the side adjacent the tractor and the plate 23 is supported thereon, as shown in Fig. 1. Thus, when the attachment is used for loosening and raising stones, it cannot swing laterally.

When the attachment is used for uprooting trees, it is secured to the outer side of the drawbar 12, as shown in Fig. 3, and the angle 21 is not used so that the beam may oscillate or swing laterally, as shown in Fig. 4. This is necessary when a tree is to be uprooted because the beam must swing laterally in order to pass by the tree as the tractor backs towards it. After the foot passes the tree, the beam swings back and the foot passes behind the tree. When the tractor moves ahead, the tree is gripped between the branches of the bifurcation and is uprooted. The blocks 20 rest upon the top of the drawbar but do not interfere with the lateral swinging thereof.

While I have described my invention in its preferred embodiment, it is to be understood that the words which I have used are words of description rather than of limitation and that changes, within the purview of the appended claims, may be made without departing from the true scope and spirit of my invention in its broader aspects.

What I claim is:

1. A device for uprooting small trees and adapted for attachment to a tractor having a transversely extending drawbar and a top link; said device comprising an I-beam; a foot, secured to one end forming the bottom of said beam, having a bifurcated portion adapted to embrace the trunk of a small tree projecting beyond one flange of said beam and a smoothly rounded portion projecting beyond the other flange of said beam; means rigidly fixed to the other end of said beam projecting therefrom in a direction opposite that of the bifurcated portion of said foot and provided in the projecting portion with means adapting it to be connected to the top link of said tractor; the flanges of said beam being notched in oppositely disposed portions thereof in a zone about midway between the ends thereof for the passage of bolts at each side of said beam for pendulously securing said beam to the drawbar of said tractor; whereby, when said device is secured to said drawbar with the bifurcated portion of said foot pointing towards said tractor and said tractor is backed to move said foot into contact with the side of a tree to be uprooted, the rounded portion of said foot will cause said beam to swing laterally until said foot has passed beyond said tree, whereupon said bifurcated portion will swing back to its normal position and engage the trunk of said tree when said tractor advances.

2. The combination with a tractor having a drawbar and a top link, of means for uprooting small trees comprising an upright beam; means pendulously securing said beam to said drawbar to swing transversely of said tractor; means projecting from the top of said beam and rigidly connected thereto at one end and connected at the other end thereof to said top link; a foot secured to the bottom of said beam having a bifurcated portion projecting substantially beyond said beam towards said tractor and adapted to engage the trunk of a small tree between the branches thereof, and a smoothly rounded portion projecting rearwardly beyond said beam; whereby, when said tractor backs said foot into contact with the side of a tree to be uprooted said rounded portion will cause said beam to swing sidewise until said foot passes said tree, whereupon, said beam will swing back and bring said bifurcated portion behind said tree in a position to engage the trunk thereof when said tractor advances.

References Cited in the file of this patent

UNITED STATES PATENTS

| | | |
|---|---|---|
| 830,783 | Groesbeck | Sept. 11, 1906 |
| 905,399 | Zimmerman | Dec. 1, 1908 |
| 2,230,766 | Smith | Feb. 4, 1941 |
| 2,410,508 | Lamme | Nov. 5, 1946 |
| 2,441,070 | Hoover | May 4, 1948 |
| 2,506,662 | Cusenbary | May 9, 1950 |
| 2,633,792 | Haines | Apr. 7, 1953 |
| 2,673,510 | Bailey | Mar. 30, 1954 |